July 26, 1955 — T. E. WOODRUFF — 2,714,185
ANTI-HUNT MEANS FOR ELECTRIC MOTOR FOLLOW-UP SYSTEM
Original Filed July 29, 1949 — 2 Sheets-Sheet 1
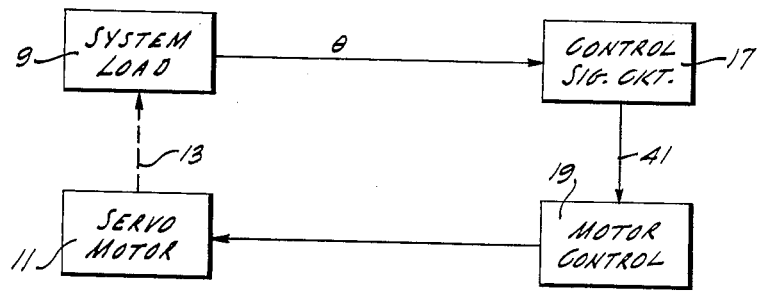
Fig. 1.
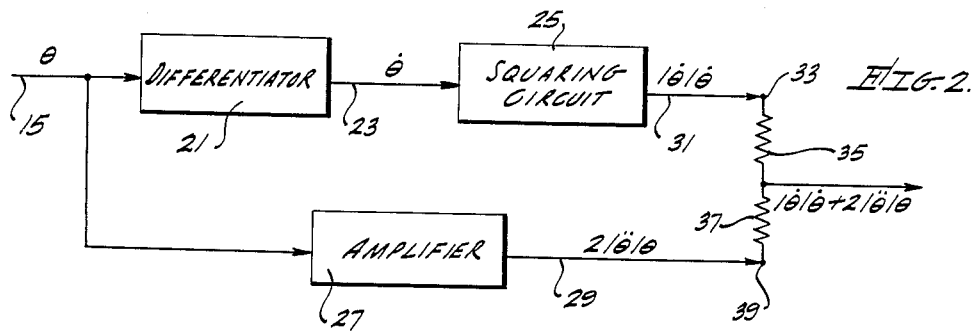
Fig. 2.
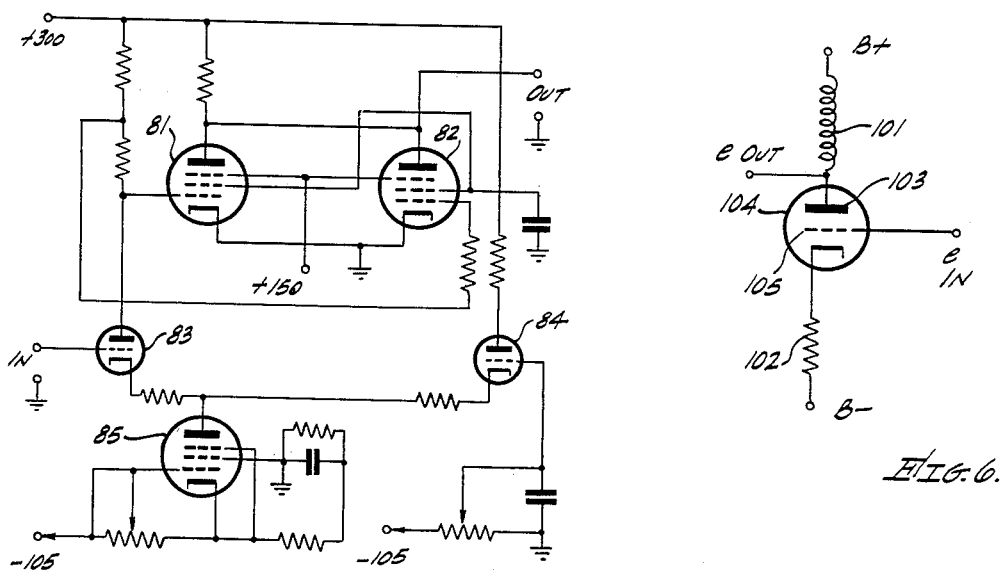
Fig. 5.
Fig. 6.
INVENTOR
THOMAS E. WOODRUFF,
BY Henry Heyman
ATTORNEY.

United States Patent Office 2,714,185
Patented July 26, 1955

2,714,185

ANTI-HUNT MEANS FOR ELECTRIC MOTOR FOLLOW-UP SYSTEM

Thomas E. Woodruff, Los Angeles, Calif., assignor, by mesne assignments, to Hughes Aircraft Corporation, a corporation of Delaware Original application July 29, 1949, Serial No. 107,558, now Patent No. 2,701,328, dated February 1, 1955. Divided and this application September 14, 1954, Serial No. 455,833

6 Claims. (Cl. 318—18)

The present invention relates to an electrical servo system and more particularly to an electrical servo system having improved control circuitry. This application is a division of United States Patent application Serial Number 107,558, filed July 29, 1949, for "Electrical Servo System," by Thomas E. Woodruff, now U. S. Patent No. 2,701,328.

Stated in somewhat general terms, an electrical servo system includes a system unbalance detector for obtaining an error signal corresponding to the displacement of a load device from a normal or desired position, a reversible servomotor mechanically coupled to the load device to correct its displacement, means for deriving control signals from the error signal, and means for controlling the energization of the servomotor in accordance with the control signals to move the load device toward the desired position. The servo loop or closed-cycle control system thus formed drives the load device toward the desired position whenever a displacement develops, and tends to maintain the error or displacement at or near zero value.

While the many servo systems thus far developed are adequate for most purposes, certain precise equipments utilizing servo systems demand an accuracy and speed of response not attainable with conventional servo systems. In proportional control systems, for example, the energization of the servomotor is increased with the load displacement, the torque and speed developed by the servomotor are correspondingly dependent upon this displacement, and the response speed or time taken to overcome the load displacement is correspondingly much greater than is ideally necessary.

It is accordingly an object of the present invention to provide an electrical servo system having improved performance characteristics.

Another object of the invention is to provide a servo system in which displacements are overcome by utilizing to full capacity the acceleration and deceleration capabilities of the system's servomotor.

An additional object of the invention is to provide a high speed servo system in which load displacements are overcome by fully energizing the system's servomotor, and switching the direction of energization of the servomotor each time the system load is driven to a point whereat full energization of the servomotor in the reverse direction would return the load to its desired position.

Still another object of the invention is to provide a servo system wherein the load, when displaced, is driven toward the point of zero displacement and zero velocity by fully energizing the servomotor, the energization of the servomotor being reversed immediately after the load has reached a point whereat full energization of the servomotor in the reverse direction would return the load to the point of zero velocity and zero displacement.

These and other objects and advantages of the present invention will become apparent from consideration of the following description, taken with reference to the accompanying drawings in which:

Figure 1 is a block diagram of an electrical servo system embodying the present invention;

Figure 2 is a schematic diagram of the control signal circuit, according to the invention, which is utilized in the system of Figure 1;

Figs. 5 and 6 are schematic diagrams of electrical circuits which may be employed in the servo system control circuit shown in Fig. 2.

Figure 3:
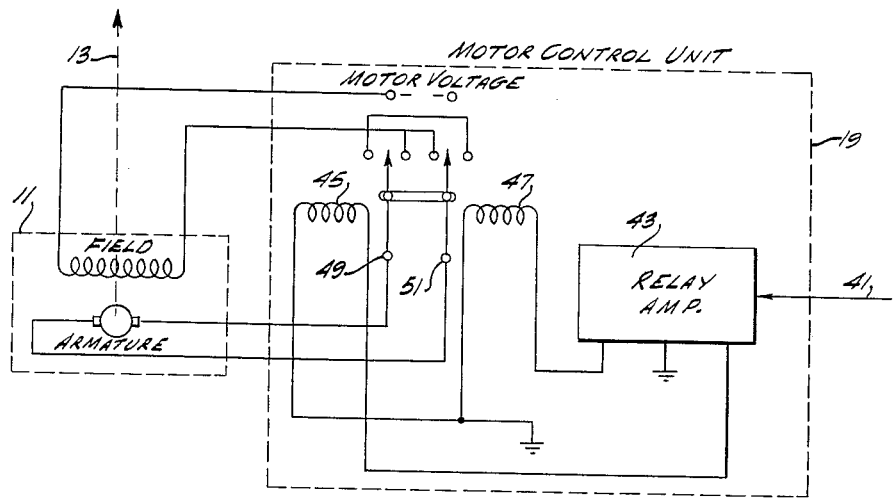
Figure 3 is a circuit diagram of one form of motor control unit which may be employed in the system of Fig. 1.

While the principles involved in the present invention may be applied to the design of many forms of automatic control systems, the embodiment here described by way of example contemplates servo systems which include a system load subject to angular displacement and a servomotor yielding rotational drive for correction of the displacement. In describing the invention, load displacements and certain factors associated therewith are referred to as either positive or negative in accordance with the sense or direction in which they occur or act. Thus, assuming a torque acting in a given direction to be positive, the rotations, velocities, and accelerations are positive when acting or taking place in that direction and negative when in the opposite direction. Similarly, displacements are termed positive or negative when they are in the direction of positive or negative rotation, respectively, as measured from some normal position. It is also to be understood that the terms "acceleration" and "deceleration," as herein utilized, signify actions in which the velocity or time rate of change of the displacement increases or decreases, respectively, in magnitude. The symbols designating various signals later referred to also designate the angular displacements and time-functions thereof to which the signals correspond. It is to be further understood that while suitable amplification and proportionality factors are, of course, necessary in actual design of the equipment, they are here omitted for purposes of simplification.

The basic principle of the present invention is the utilization of full servomotor drive at all times during all portions of a displacement-correction cycle, that is, both in accelerating and decelerating the load toward the end conditions of substantially zero velocity and zero displacement. For example, assuming an instance in which the system load experiences a displacement and is at rest at the moment that corrective action is initiated, an ideal cycle would involve first accelerating the system load toward zero displacement at full capability of the servomotor and then, at a suitable instant before reaching zero displacement when full energization of the servomotor in the reverse direction would return the load to zero displacement and zero velocity, braking or decelerating the system load at maximum capability of the servomotor. This ideal cycle achieves the fastest possible correction of system load displacement, and the practical embodiment to be described closely approaches such action.

Referring first to the general organization of the novel servo system as illustrated in block diagram form in Figure 1, a system load 9 is positionable by a reversible servomotor 11 through gearing schematically represented by a dotted line 13. System load 9 includes means for developing an error or displacement signal $\theta$ at an associated output lead 15, the error signal having a characteristic which varies in accordance with the instantaneous angular displacement $\theta$ of system load 9 from a desired position. System load 9 may, for example, be an electro-optical apparatus including a sighting structure and means for providing an error signal $\theta$ corresponding to the deviation between the sighting structure's pointing direction and the true line of sight to a bright body in the field of view.

Error signal $\theta$ is applied to the input circuit of a derivation or control signal circuit 17 which, in the specific embodiment to be described, develops signals having instantaneous values proportional to a first term involving the displacement $\theta$ and to a second term involving displacement rate or velocity $\dot{\theta}$, and summates the two signals to provide a control signal which at any instant is either positive, negative, or zero, depending upon the sense and relative magnitudes of the two terms. The control signal output of derivation circuit 17 is applied to a motor control unit 19, adapted to energize servomotor 11 at full operating voltage at all times and, further, to control the director of motor torque in accordance with the polarity of the control signal, effecting return of the load device toward zero displacement in a manner detailed hereinafter.

According to the invention, control signal circuit 17 is arranged to provide a control signal corresponding to the summation of a velocity term $|\dot{\theta}|\dot{\theta}$ and a displacement term $2|\ddot{\theta}|\theta$. In these expressions, $\theta$ represents the load displacement, which is either positive or negative, $\dot{\theta}$ is a variable representing the time rate of change of the displacement $\theta$ and may be either positive or negative depending upon the direction of rotation, $|\dot{\theta}|$ represents the absolute magnitude of the variable velocity, and $|\ddot{\theta}|$ represents the magnitude of the acceleration or deceleration of servomotor 11, which will be assumed to be substantially constant over the range of load displacement. The term $|\dot{\theta}|\dot{\theta}$ is thus equal to $\dot{\theta}^2$ with sign corresponding to the sense or direction of the velocity, and the term $2|\ddot{\theta}|\theta$ similarly takes on the sign corresponding to the sense or direction of the displacement.

With reference now to Fig. 2, there is shown one form of control signal circuit which may be employed to obtain and combine the electrical signals proportional to the load velocity and load displacement terms. As shown in Fig. 2 the error signal $\theta$ is applied over lead 15 to a differentiator 21, which provides at an associated output lead 23 a velocity signal $\dot{\theta}$ proportional to the first time-derivative or time-rate of change of displacement $\theta$. The velocity signal $\dot{\theta}$ is then applied to a squaring circuit 25 which produces an output signal $|\dot{\theta}|\dot{\theta}$, so expressed to indicate that its polarity is dependent upon the sense of velocity signal $\dot{\theta}$ rather than continuously positive as in true mathematical squaring.

Displacement signal $\theta$ is also applied over conductor 15 to an amplifier 27 which provides at an associated output lead 29 an output signal proportional to $2|\ddot{\theta}|\theta$. The factor $|\ddot{\theta}|$ is here set in as a fixed multiplier, since as previously noted, the acceleration and deceleration of the servomotor are substantially constant in magnitude over the normal operating range of the servomotor. The polarity of the signal $2|\ddot{\theta}|\theta$ is thus dependent only upon the sense or direction of displacement $\theta$.

Signal $|\dot{\theta}|\dot{\theta}$ is applied over lead 31 to one input terminal 33 of a summation circuit which comprises two serially connected resistors 35 and 37, while signal $2|\ddot{\theta}|\theta$ is applied over lead 29 to a second input terminal 39 of the summation circuit. The resultant control signal developed by the derivation circuit is in this instance proportional to the sum of velocity term $|\dot{\theta}|\dot{\theta}$ and displacement term $2|\ddot{\theta}|\theta$, and is applied over lead 41 to the motor control unit 19 shown in Figure 1.

Motor control unit 19 may be designed to utilize fast acting relay switches in a circuit which functions to apply full operating voltage to servomotor 11, and further functions to cause the servomotor torque to be developed in a positive or forward direction for negative control-signals, and in a negative or reverse direction for positive control-signals. Servomotor 11 may be a D.-C. motor, for example, and motor control unit 19 may be arranged to reverse its armature or field connections substantially at the instants of reversal of control signal polarity. A suitable circuit which functions in this manner is shown in Figure 3, in which a relay amplifier 43, to which the control signals are applied over lead 41, selectively energizes either of two relay coils 45, 47 to control the position of linked switch arms 49 and 51 in accordance with the control signal polarity and thereby control the direction of energization of the servomotor. It will be recognized, of course, that numerous other electronic circuits may be utilized to provide equivalent operation.

The operation of the servo system of the invention, as set forth hereinabove, may be conveniently explained with reference to the curves shown in Figure 4, in which the time rate of change of the load displacement is plotted against system load displacement. The curves 53 and 55 in Fig. 4 define the angular displacement and velocity conditions for which the control signal is zero, as expressed by the equation:

$$|\dot{\theta}|\dot{\theta}+2|\ddot{\theta}|\theta=0$$

Points in the area lying above zero-signal curves 53 and 55 therefore represent the conditions of angular displacement and velocity for which the control signal is positive, and similarly, the conditions resulting in a control signal of negative polarity are represented by points lying below the curves. The further significance of curves 53 and 55 lies in the fact that they delineate the precise conditions of displacement $\theta$ and the displacement rate $\dot{\theta}$ at which deceleration of the servomotor at full capacity would carry the system load to zero velocity at zero displacement.

Figure 4:
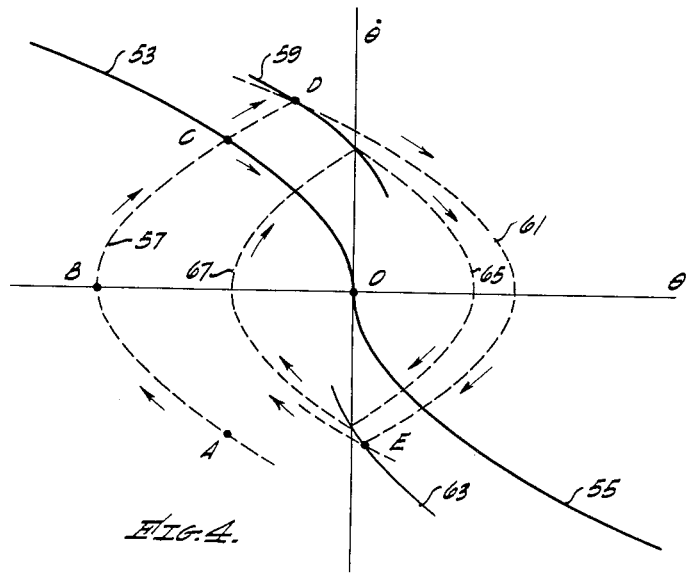
Figure 4 is a graph illustrating system load movements effected by the control signal circuit of Fig. 2.

In order to illustrate more specifically the operation of the servo system of the invention, assume that the system load has a negative displacement accompanied by a negative velocity, as at the point A in the Figure 4 graph. It will be recognized that the corresponding instantaneous value of the control signal produced by the control signal circuit of Fig. 2 is negative. Accordingly, servomotor 11 is energized at full applied voltage to exert its torque in a forward or positive direction, decelerating the system load until zero velocity is reached, as indicated by tracing the lower portion of positive-acceleration curve 57 in a clockwise direction to the point B. Still under the influence of forwardly directed torque, the system load then accelerates toward zero displacement, the displacement and velocity conditions following along curve 57 and at some instant reaching values which satisfy the zero control-signal curve 53, as indicated by the intersection point C.

Assuming the control signal to become positive and the driving torque to become negative at the very instant that the system load reaches the displacement and velocity conditions of point C, the forward or positive velocity would then decrease under deceleration $|\ddot{\theta}|$, the displacement and velocity following along curve 53 in the indicated clockwise direction until zero velocity and zero displacement would be reached simultaneously at the point O. In actual practice, however, the decelerating torque does not come into play at the very instant when the system load conditions reach the zero control-signal curve, but rather at a later instant, as at the intersection of the acceleration curve 57 and a control curve 59, which is designated point D in Fig. 4. This delay between point C and point D is due to inherent time-lags in the system components such as the delay in the opening of the relays in the motor control unit.

After the energization of the servomotor has been reversed at point D, the system load follows along a negative-acceleration curve 61 in the indicated clockwise direction, again past the zero control-signal curve 55 to an intersection point E lying on a control curve 63 at which time the energization of the servomotor is again reversed. This action is continuous and causes the system load to quickly reach a final condition in which it oscillates about the point of zero displacement, as indicated by the closed loop consisting of curves 65 and 67.

While the oscillation or vibration produced at the load by the described servo system might appear to be large because of the seemingly wide loops formed by curves 65 and 67 in Figure 4, the vibration is actually fast and small in amplitude, for Figure 4 represents to an enlarged scale the system behavior in the immediate vicinity of the point of zero velocity and zero displacement. In a typical instance, for example, in which the system includes a 28 volt, 1/12 horsepower servomotor having an acceleration characteristic of 5,000 radians per second per second as measured at the motor shaft, and in which the servomotor is coupled to the system load through 360 to 1 reduction gearing, the total or effective time-lag in the system is of the order of 4 milliseconds. The frequency of the resultant stable oscillation is in this instance approximately 50 cycles per second, and its amplitude as measured at the system load is of the order of one minute of angle.

It will be recognized that the configurations of the several curves followed by the system load as above described are plotted from the appropriate equations of angular motion. For example, curve 57 of the Figure 4 graph represents the particular positive-acceleration curve upon which the assumed initial point A falls, and is defined by the equation.

$$\dot{\theta}^2 - \dot{\theta}_A^2 = 2\ddot{\theta}(\theta - \theta_A)$$

where $\ddot{\theta}$ is a fixed positive acceleration, $\theta_A$ and $\dot{\theta}_A$ are, respectively, the system load displacement and velocity represented at the point A, $\theta$ is the displacement at any point along the curve, and $\dot{\theta}$ is the corresponding velocity at that point. In terms of the displacement $\theta_B$ of point B at which the velocity becomes zero upon this curve, the equation may be rewritten as $$\dot{\theta}^2 = 2\ddot{\theta}(\theta - \theta_B)$$

and there is a family of such positive-acceleration curves, each having exactly the same configuration but displaced along coordinate axis $\theta$. Since the specified acceleration is positive, these curves must, of course, be followed in a clockwise or increasing positive velocity direction to trace successive load conditions.

Similarly, the equation of the negative-acceleration curve 61 upon which point D falls is defined by the formula $$\dot{\theta}^2 - \dot{\theta}_D^2 = 2\ddot{\theta}(\theta - \theta_D)$$

where $\ddot{\theta}$ has a negative value. Here too there is a family of such curves in which the appropriate curve must again be traced clockwise, in an increasing negative velocity direction, to trace successive conditions.

The positions and configurations of control curves 59 and 63 which are utilized to graphically find the points at which reversals of driving torque take place, may be determined by use of the formula $$\Delta\dot{\theta} = T\ddot{\theta}$$

in which T is the effective delay time characteristic of the servo system, $\ddot{\theta}$ is the acceleration or deceleration, and $\Delta\dot{\theta}$ is the resultant change in velocity taking place between the instant at which the control-signal becomes zero and the instant at which torque reversal actually takes place. Referring to positive-acceleration curve 57, for example, the difference in velocities represented by points C and D thereon is equal to the product of the acceleration $\ddot{\theta}$ and delay time T. Since the acceleration and delay time have fixed values, the velocity change is of constant magnitude, in going between zero control-signal curve 53 or 55 and control curve 59 or 63 along any acceleration curve. Accordingly, control curves 59 and 63 may be readily plotted graphically.

Referring now to Figs. 5 and 6, there are shown circuit diagrams of a squaring circuit and a differentiating circuit, respectively, which may be utilized in the control system of the present invention as shown in Fig. 2. It is to be understood, of course, that these circuits are merely illustrative of suitable forms of the components, and that other circuits may be used without departing from the spirit and scope of the present invention.

In Fig. 5, there is shown a push-pull squaring circuit which is essentially the same as that illustrated in Figs. 19–22 on page 685, vol. 19 of the M. I. T. Radiation Laboratory Series entitled "Waveforms," and published in 1948 by the McGraw-Hill Book Company. In this circuit, tubes 81 and 82 constitute push-pull squaring circuits, and tubes 83 and 84 constitute a push-pull amplifier for supplying the input to squaring tubes 81 and 82. Tube 85 serves as a very high impedance common cathode load for tubes 83 and 84. The output voltage of this circuit is proportional to the square of the input voltage.

Referring now to Fig. 6, there is illustrated a differentiating circuit which is substantially the same as that shown in Figs. 4–14 on page 73 of vol. 21 of the M. I. T. Radiation Laboratory Series entitled "Electronic Instruments," and published in 1948 by the McGraw-Hill Book Company. In this circuit, inductor 101 and resistor 102 form the differentiating elements, the output signal, which appears on the plate 103 of tube 104, being proportional to the first derivative with respect to time of the input signal applied to grid 105 of tube 104.

It is apparent that many embodiments employing the principles of the present invention may be devised, utilizing conventional components and circuitry giving end results which are equivalent to those achieved in the embodiment above described. For example, the displacement or deviation may be obtained in the form of an A. C. signal having a phase characteristic related to the deviation $\theta$. This signal may be suitably amplified, then converted to a D. C. signal $\theta$ by a phase comparator. Differentiation may be accomplished by use of an RC circuit, and amplifiers, wherever necessary, may be of either D.-C. or A.-C. signal type suitably designed for the purpose. Similarly, many conventional types of servomotor and reversing controls therefor are available, and may be utilized in practice of the present invention. It is therefore intended that all matter contained in the preceding description or shown in the accompanying drawings shall be interpreted as illustrative and not in a limiting sense.

I claim as my invention:

1. A servo system for returning a displaced load to a predetermined position, said system comprising: a reversible motor for driving the load; selectively actuable means for fully energizing said motor in either direction to return the load to the predetermined position; first means responsive to the displacement of the load for continuously producing a first electrical signal corresponding to the load displacement; second means including an amplifier circuit coupled to said first means and responsive to said first signal for continuously producing a second electrical signal whose magnitude and polarity are represented by the term $2\theta|\ddot{\theta}|$, where $\theta$ represents the load displacement and $|\ddot{\theta}|$ represents the absolute magnitude of the load acceleration or deceleration; third means coupled to said first means and responsive to said first signal for continuously producing a third electrical signal whose magnitude and polarity are represented by the term $\dot{\theta}|\dot{\theta}|$, where $\dot{\theta}$ represents the time rate of change of the load displacement, said third means including a differentiating circuit coupled to said first means and responsive to said first signal for producing a velocity signal corresponding to the term $\dot\theta$, and a squaring circuit connected to said differentiating circuit and responsive to said velocity signal for producing said third signal; and means coupled to said second and third means and responsive to the algebraic sense of the summation of said second and third signals for selectively actuating said selectively actuable means to energize said motor in a restoring direction.

2. A servo system for rapidly returning a displaced load to a point of zero displacement and zero velocity, said system comprising: a reversible motor for driving the load, said motor being fully energizable in either direction and having a substantially constant acceleration and deceleration characteristic over the range of load displacement; selectively actuable means for fully energizing said motor in either direction; and a control circuit for selectively actuating said selectively actuable means to fully energize said motor to drive said load toward a point whereat full energization of the motor in the opposite direction would return the load to the point of zero displacement and zero velocity, said control signal circuit including first means having an amplifier for generating first electrical signal represented by the term $2\theta|\ddot\theta|$, where $\theta$ represents the instantaneous load displacement and $|\ddot\theta|$ represents the absolute magnitude of the substantially constant acceleration and deceleration characteristic of said motor, second means including a differentiator and a squaring circuit connected in cascade, said second means being responsive to the displacement of the load for continuously generating a second electrical signal proportional to the term $\dot\theta|\dot\theta|$, where $\dot\theta$ represents the time rate of change of the load displacement, summation means for combining said first and second signals to produce an output signal having a polarity corresponding to the algebraic sense of the summation of said first and second signals, and means for applying said output signal to said selectively actuable means for reversing the energization of said motor when said output signal changes polarity.

3. A system for returning a displaced load toward a predetermined position, said system comprising: a reversible motor for driving the load, said motor being acceleratable and deceleratable at a substantially constant rate over the range of load displacement; selectively actuable means for fully energizing said motor in either direction to return the load toward the predetermined position; and control means continuously responsive to the displacement of the load and to the time rate of change of the displacement for selectively actuating said selectively actuable means, said control means including a differentiator circuit for developing a first electrical signal whose magnitude and polarity correspond to the term $\dot\theta$, where $\dot\theta$ represents the time rate of change of the load displacement; a squaring circuit coupled to said differentiator circuit and responsive to said first electrical signal for producing a second electrical signal whose magnitude and polarity are proportional to the term $\dot\theta|\dot\theta|$, amplifying means for developing a third electrical signal whose polarity and magnitude are represented by the term $2\theta|\ddot\theta|$ where $\theta$ represents the instantaneous load displacement and $|\ddot\theta|$ represents the absolute magnitude of the load acceleration or deceleration corresponding to the constant motor acceleration or deceleration, respectively, a summation network having first and second input terminals coupled to said squaring circuit and said amplifying means respectively, said summation network being responsive to said second and third electrical signals for producing an electrical output signal whose polarity changes each time the load is driven past a point whereat instantaneous reversal of the motor would drive the load to the predetermined position, and means for applying said output signal to said selectively actuable means, said selectively actuable means being responsive to said output signal for fully energizing said motor in one direction when said output signal is of one polarity, and for fully energizing said motor in the opposite direction when said output signal is of the other polarity.

4. In a servo system wherein a displaceable load is movable, when displaced, toward a predetermined position of zero displacement and zero velocity by an associated servomotor which is selectively energizable in either direction, a control unit for selectively energizing the motor in a restoring direction to return the load to a point whereat full energization of the motor in the reverse direction would return the load to the predetermined position, and for reversing the energization of the motor after the point has been reached, said control unit comprising: first means for generating a first electrical signal proportional to the term $\theta$, where $\theta$ represents the instantaneous load displacement; second means including an amplifier coupled to said first means and responsive to said first signal for producing a second electrical signal proportional to the term $2\theta|\ddot\theta|$, where $|\ddot\theta|$ represents the absolute magnitude of the acceleration or deceleration of the servomotor; third means including a differentiating circuit and an electronic squaring circuit connected in cascade, said third means being coupled to said first means and being responsive to said first signal for developing a third electrical signal proportional to the term $\dot\theta|\dot\theta|$, where $\dot\theta$ represents the time rate of change of said first signal; a summation network including first and second input terminals for receiving said second and third signals, respectively, said summation network being responsive to said second and third signals for combining said signals to produce an electrical output signal corresponding to the algebraic summation of said second and third signals; and selectively actuable means coupled between said summation network and the servomotor, said selectively actuable means being responsive to said output signal for energizing said servomotor in one direction when said output signal is of one polarity and for energizing said servo motor in the opposite direction when said output signal is of the opposite polarity.

5. In a servo system wherein a displaceable load is movable, when displaced, toward a point of zero displacement and zero velocity by an associated servomotor which is selectively energizable in either dircetion under the control of a selectively actuable motor control unit, a servo control circuit for selectively actuating the selectively actuable motor control unit to energize the motor in a restoring direction for returning the load to a point whereat full energization of the motor in the reverse direction would return the load to the point of zero displacement and zero velocity, and for actuating the selectively actuable motor control unit thereafter to reverse the energization of the motor, said control unit comprising: first means for generating a first electrical signal proportional to the term $\theta$, where $\theta$ represents the instantaneous load displacement; second means including an amplifier coupled to said first means and responsive to said first signal for producing a second electrical signal proportional to the term $2\theta|\ddot\theta|$, where $|\ddot\theta|$ represents the absolute magnitude of the acceleration or deceleration of the servomotor; third means including a differentiating circuit and an electronic squaring circuit, said third means being coupled to said first means and being responsive to said first signal for developing a third electrical signal proportional to the term $\dot\theta|\dot\theta|$, where $\dot\theta$ represents the time rate of change of said first signal; and a summation network coupled to said second and third means for combining said second and third signals to produce an electrical output signal the polarity of which changes each time the load has been driven to a point whereat full energization of the motor in the reverse direction would return the load to a point of zero displacement and zero velocity, the selectively actuable motor control unit being responsive to the polarity of said output signal for controlling the direction of movement of the motor.

6. In a servo system wherein a displacement signal is generated each time a system load is displaced from a predetermined position, the magnitude and polarity of the displacement signal corresponding to the magnitude and displacement of the load, and wherein a reversible servomotor, having a substantially constant acceleration-deceleration characteristic over the range of load displacement, is operable for moving the load in a restoring direction under the control of a selectively actuable motor control unit, a servo control circuit for selectively actuating the selectively actuable motor control unit to energize the motor in a restoring direction for returning the load to a point whereat full energization of the motor in the reverse direction would return the load to a point of zero displacement and zero velocity, and for reversing the energization of the motor thereafter, said control unit comprising: first means including an amplifier responsive to the displacement signal for producing a first electrical signal proportional to the term $2\theta|\dot{\theta}|$, where $\theta$ represents the load displacement and $|\dot{\theta}|$ represents the absolute magnitude of the acceleration or deceleration of the servomotor; second means including a differentiating circuit and an electronic squaring circuit coupled in cascade, said second means being responsive to the displacement signal for developing a second electrical signal proportional to the term $\dot{\theta}|\dot{\theta}|$, where $\dot{\theta}$ represents the time rate of change of the displacement signal; and a summation network coupled to said first and second means and responsive to said first and second signals for producing an electrical output signal the polarity of which changes each time the load has been driven to the point whereat full energization of the motor in the reverse direction would return the load to a point of zero displacement and zero velocity, the selectively actuable motor control unit being responsive to the polarity of said output signal for controlling the direction of movement of the motor.

No references cited.